United States Patent [19]

Gongwer et al.

[11] 4,453,457
[45] Jun. 12, 1984

[54] AUTOMATIC FOOD COOKING MACHINE

[75] Inventors: Nelson Gongwer; Dean Gongwer, both of Wakarusa, Ind.

[73] Assignee: Nelgo Manufacturing Corporation, Wakarusa, Ind.

[21] Appl. No.: 277,901

[22] Filed: Jun. 26, 1981

[51] Int. Cl.$^3$ ............................................. A47J 37/04
[52] U.S. Cl. ........................................ 99/345; 99/386; 99/389; 99/402; 99/427; 99/443 C; 99/448; 219/388
[58] Field of Search ................. 99/345, 346, 386, 389, 99/391, 393, 402, 427, 443 C, 448; 49/387; 219/388, 402

[56] References Cited

U.S. PATENT DOCUMENTS

| | | | |
|---|---|---|---|
| 1,662,847 | 3/1928 | Cook | 99/386 |
| 2,533,080 | 12/1950 | Alexander | 99/346 X |
| 2,608,010 | 8/1952 | Anderson | 49/387 X |
| 2,689,517 | 9/1954 | Angelus | 99/345 |
| 2,705,913 | 4/1955 | Bloom | 99/386 X |
| 3,295,434 | 1/1967 | Wilhelm et al. | 99/346 |
| 3,499,380 | 3/1970 | Gongwer | 99/427 X |
| 4,103,606 | 8/1978 | Gitcho | 99/345 |

*Primary Examiner*—Billy J. Wilhite
*Attorney, Agent, or Firm*—John J. Gaydos

[57] ABSTRACT

An oven in a cooking machine has a pair of spaced parallel endless conveyor chains mounted therein and driven by a motor. Pivotally supported baskets for holding food are connected normal to the conveyor chains. Electrical heating elements disposed between and above the baskets are supported in the oven for cooking the food products. Guide rails maintain the baskets horizontally disposed as the baskets move adjacent to the heating elements. A sauce tank disposed in one end of the oven receives the baskets containing the food products. Each of the baskets is immersed in the sauce once during each cycle of operation. To remove the cooked food products from the oven, spaced runners are shifted over the sauce tank to prevent the baskets of food products from being dipped into the sauce. A movable collar connects and disconnects the conveyor chains to the motor. A door at the front of the oven has counterweights to facilitate opening and closing of the door by an operator.

4 Claims, 6 Drawing Figures

AUTOMATIC FOOD COOKING MACHINE

The present invention relates to a food cooking machine and, more particularly, to an automatic food cooking machine for broiling food products.

During the past two decades there has been a tremendous growth in restaurants, especially fast food restaurants, the majority of such restaurants selling fried chicken, broiled hamburgers, and fish to consumers. The fried chicken usually offered for sale to consumers is pressure cooked, dipped into a batter and then deep fried. Pork chops and other broiled food products generally have not been available from fast food restaurants. Because of the increased demand by consumers for broiled chicken, pork chops and the like, prepared by an automatic food cooking machine such as described and claimed in U.S. Pat. No. 3,499,380 issuing on Mar. 10, 1970, fast food restaurants are desirous of having available for sale broiled chicken, pork chops, and other similar food products. The automatic food cooking machine as described in the above patent has been successfully manufactured and sold and used throughout the country, but because such machine employs charcoal as a heating means, the machine must be kept outside. It would, therefore, be desirable to provide an automatic food cooking machine of the continuous conveyor type with an electric heating means capable of broiling food products.

As the food products are being broiled in the automatic food cooking machine, a sauce is applied to the food products to improve the flavor of such food products. Optimum flavor is obtained when the food products are alternately broiled by the radiant energy and heat emanating from the heating means and and then impregnated and covered with a sauce until the food products have been properly cooked. After the food products are thoroughly broiled or cooked, it would be desirable instead of removing the sauce tank, to provide movable runners in the oven to prevent the food products from being dipped into the sauce, which runners enable the baskets containing the food products to bypass the sauce, thereby facilitating handling of substantially drip free food products. It would also be desirable to employ a detachable means for disconnecting the drive shaft from the drive means while attaching or removing a basket containing food products to the conveyor means of the machine.

With the recent high cost of energy, it is desirable to keep the heat loss to the oven to a minimum by using insulation in the walls and the door of the oven of the food cooking machine. Understandably, thickening of the door of the oven to increase the space for the insulation increases the weight of the door. It would, therefore, be desirable to employ weight counter-balancing means on the door to facilitate opening and closing of the door in a simple and facile manner.

Accordingly, it is the object of the present invention to provide an automatic food cooking machine of the endless conveyor type with electric heating means.

Another object of the present invention is to provide an automatic food cooking machine having a horizontally disposed endless conveyor and an electric heating means disposed above and below the upper horizontal section of the endless conveyor.

An additional object of the present invention is to provide an automatic food cooking machine of the endless conveyor type with movable runners for preventing the food products from being dipped into a sauce disposed adjacent to the endless conveyor.

A further object of the present invention is to provide an automatic food cooking machine with disconnect means such as a movable collar for connecting and disconnecting the drive means to the driven means of the machine.

Still another object of the present invention is to provide an automatic food cooking machine of the endless conveyor type employing and electric heating means in an oven having insulated walls and a weight counter-balancing means for the door of the oven.

Further objects and advantages of the present invention will become apparent as the following description proceeds, and the features of novelty which characterize the invention will be pointed out in particularity in the claims annexed to and forming a part of this specification.

Briefly, the present invention is directed to an improved automatic food cooking machine comprising a horizontal frame supporting an oven having an unobstructed opening therein. Mounted in the oven are a pair of spaced parallel, horizontally disposed endless conveyor chains supported on sprockets connected to a pair of spaced shafts driven by a drive means such as a motor. A plurality of baskets are pivotally connected to and supported by the conveyor chains and sauce is disposed in a tank adjacent to one end of the endless conveyor. A plurality of electrical heating means are disposed above and below the upper horizontal section of the endless chain for broiling the food products supported by the endless conveyor chains. While the food products are being cooked, guide rails maintain the baskets containing the food products in a horizontal path parallel to the heating means as the conveyor chains move the baskets from one end of the oven to the other. During each cooking cycle, when each of the baskets reaches the forward end of the rails, the basket pivots from the horizontal position and drops to a vertical position and into the sauce tank dipping the basket and the food products into the sauce. Each of the baskets is then slowly lifted by the conveyor chains from the sauce tank and driven between the electrical heating means.

After the food products are broiled and properly cooked, a movable runner is shifted and positioned over the sauce tank to prevent the baskets from pivotally dipping into the sauce thereby permitting removal of the baskets and the cooked food products with a minimum of sauce. A movable collar having a pair of slots is employed for connecting and disconnecting the drive means from the drive shaft of the machine. Heat loss is minimized and is maintained within the oven of the machine by increasing the thickness of the walls of the oven and by providing insulation in the walls. An opening in the oven for inserting and removing the elongated baskets containing the food products is provided with an insulated door. To facilitate opening and closing of the door, a weight counter-balancing means is secured to the door and comprises a pair of solid metal pieces adjustably secured to a pair of elongated rods extending from opposite sides of the door in spaced parallel relationship to the sidewalls of the oven of the automatic food cooking machine.

For a better understanding of the invention, reference may be had to the accompanying drawings where the same reference numberals have been applied to like parts and wherein.

Figure 1:
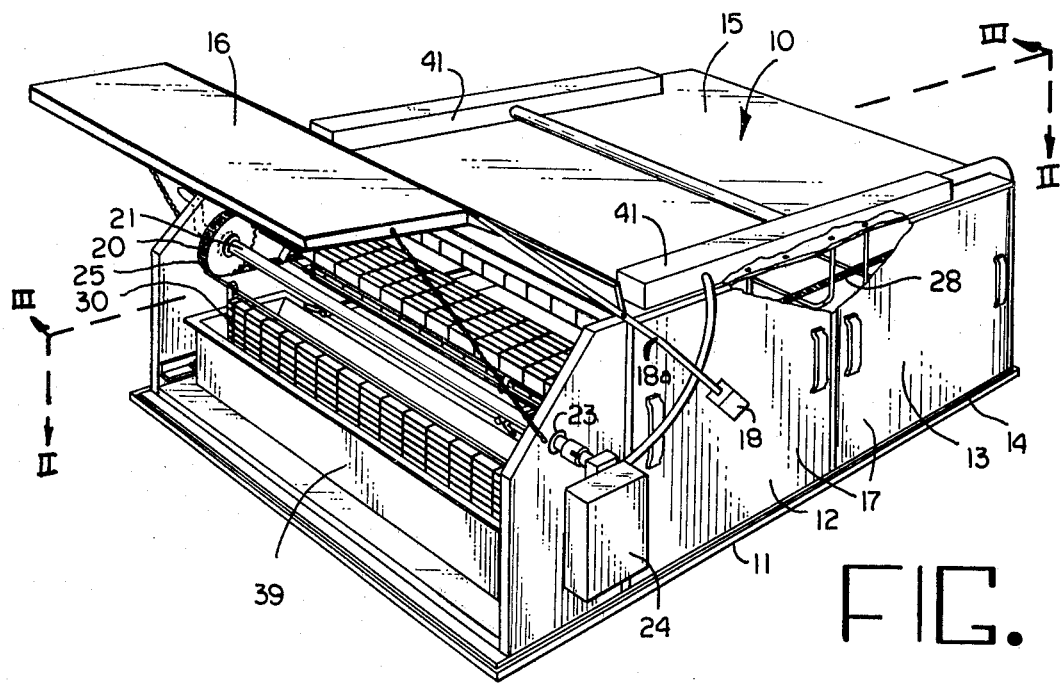
FIG. 1 is an isometric view of an automatic electric food cooking machine built in accord with the present invention.

Referring now to the drawings, there is illustrated an automatic food cooking machine, generally designated at 10, comprising a frame 11 supporting an oven 12. The oven 12 is defined by a pair of spaced vertically disposed side walls 13, a bottom wall 14, secured to the frame 11 and a top wall 15 connected to the side walls 13 providing a substantially unobstructed opening from the front to the rear of the oven. A door 16 closes an opening provided in front of the oven 12. Doors are also provided in the side walls 13 of the oven to provide access to the interior of the oven.

Figure 2:
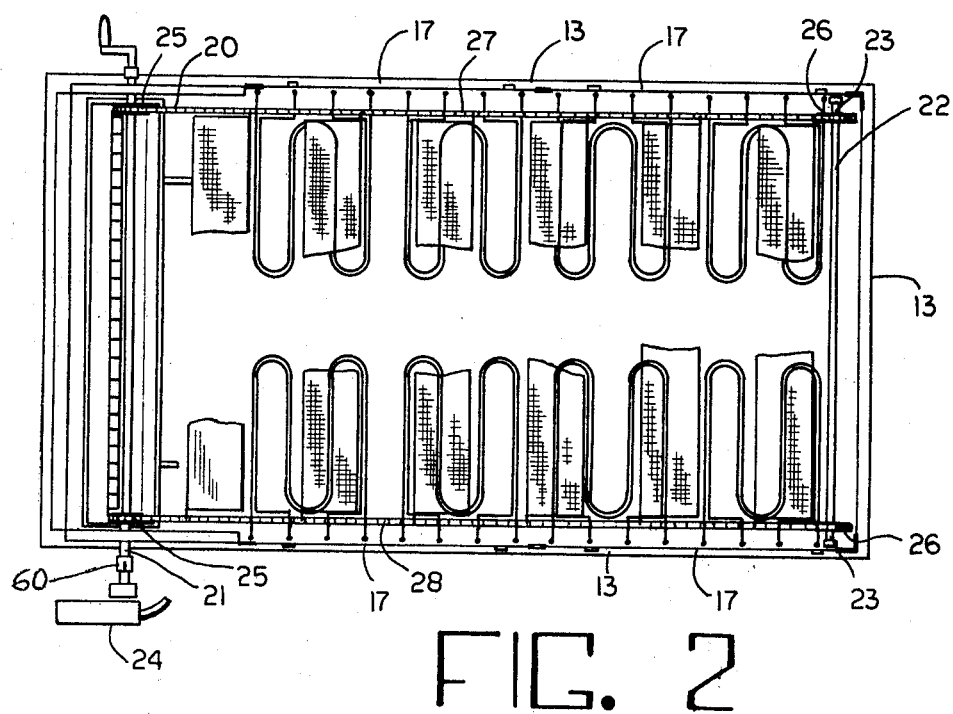
FIG. 2 is a sectional view taken along line II of FIG. 1.

The oven and all of the parts thereof are preferably of metal except for the insulation in the walls of the oven to reduce heat transfer through the walls during operation of the automatic food cooking machine 10. The walls and the door are made of stainless steel sheet metal and filled with a suitable inorganic insulation. A conveyor means 20, mounted in the oven transports food products contained in a plurality of baskets 30 (See FIG. 3) during the cooking period around and through an electric heating means 40. As best shown in the FIGS. 2 and 3, the conveyor means 20 comprises a pair of spaced parallel shafts 21, 22 rotatably mounted in bearings 23 secured to the frame, the shaft 21 being disposed in the front of the oven 12 and the shaft 22 being disposed in the rear of the oven 12. The front shaft 21 is drivingly connected to a power means 24 such as a variable speed gear motor for rotating the shaft in either direction at a predetermined speed. A pair of sprockets 25 are secured to opposite ends of the front shaft 21 and a pair of rear sprockets 26 (See FIG. 2) are secured to opposite ends of the rear shaft 22. A pair of spaced conveyor chains 27, 28, drivingly interconnects the front and rear sprockets. The conveyor chains 27, 28 are driven by the front shaft 21, and the sprockets secured thereto, and the rear shaft 22 and the sprockets rotate freely and are solely for supporting and maintaining proper tension on the chains 27, 28. Suitable means are provided for shifting the rear shaft 22 toward or away from the front shaft 21 to control the tension of the conveyor chains 27, 28.

Figure 3:
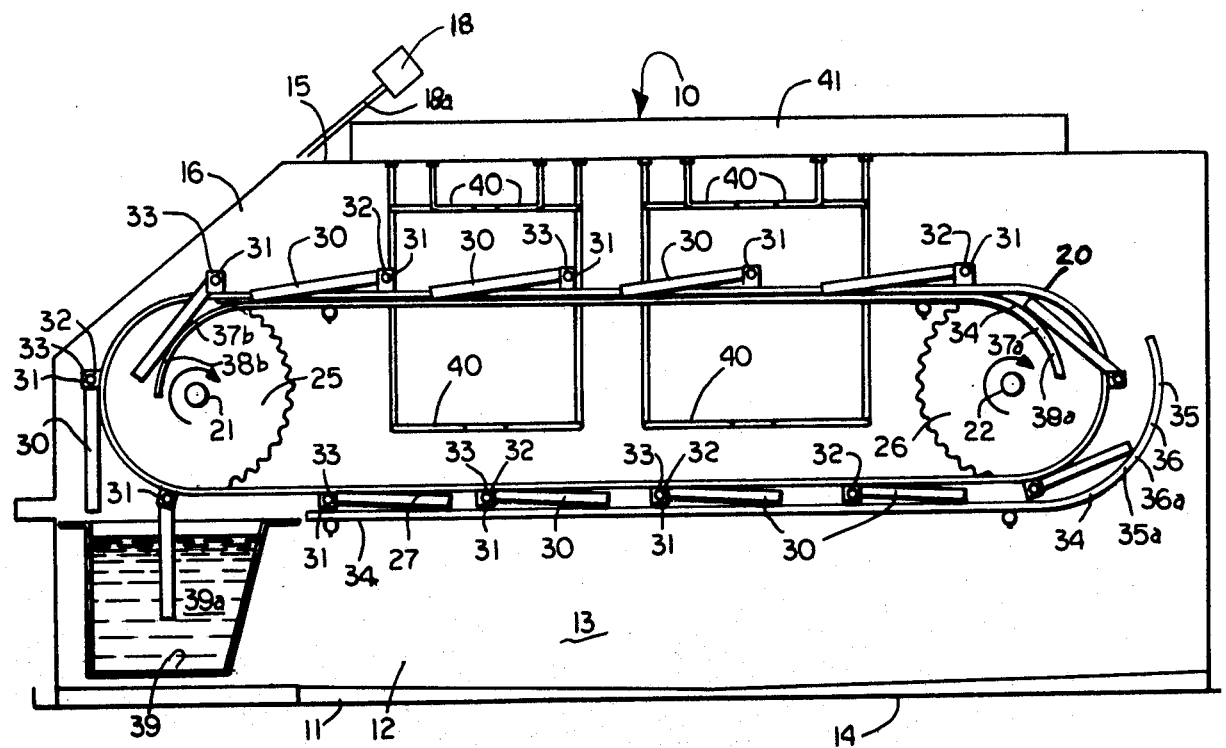
FIG. 3 is a sectional view taken along III of FIG. 1.

The wire mesh baskets 30 are pivotally mounted on the conveyor chains 27, 28 for supporting the food products. More specifically, a plurality of driving lugs 31, as best seen in FIG. 3 of the drawings, are secured to the conveyor chains 27, 28 at spaced intervals and arranged in pairs, one lug 31 of each pair being secured to one of the chains 27, 28. A plurality of rods 32, each of the rods carrying one of the baskets and detachably connected to each of the pair of lugs, transports the baskets in continuous cycles. The end portions of each of the baskets are provided with quick disconnect means 33 for quickly disconnecting the baskets from the conveyor chains 27, 28. Any suitable mounting means for the baskets is satisfactory so long as each of the baskets can rotate freely and pivot from a horizontal to a vertical position, as best shown in FIG. 3 of the drawings, during a single cooking cycle, i.e., the transporting or movement of a basket in the oven through one revolution. The size of the basket depends upon the type of food products to be cooked, i.e., the space between the walls of each of the baskets should keep the food products firmly in place to prevent movement of the food products as the baskets are transported by the conveyor means during the cooking cycles. The number of baskets 30 mounted on the conveyor chains 27, 28 depends upon the length of the oven and the length of the conveyor chains in the opening of the oven.

As each of the baskets 30 is transported by the conveyor means 20 in the oven from the front to the rear and then from the rear to the front of the oven 12 to complete the cooking cycle, it is preferable that guide means 34 be employed for maintaining the baskets in a horizontal position, i.e., parallel to an electric heating means 40 disposed in the oven above and below the top section of the conveyor means. The guide means 34 comprises two pairs of elongated rails 35, 36 for supporting the baskets. The rear portions 35a, 36a of the lower pair of rails preferably are jointed together and curved upwardly to receive each of the baskets as each basket is being rotated 180 degrees by the downwardly curved ends 37a, 38a of the upwardly disposed rails 37, 38. The lower pair of rails 35, 36, lie just below the plane of each of the lower sections of the conveyor chains 27, 28, assuring that the baskets are transported by the conveyor means 20 horizontally over the electric heating means 40.

In order to improve the flavor of the food products being cooked, a sauce tank 39 filled with sauce 39a is disposed in the front portion of the oven below the sprockets. As each of the baskets approaches and moves beyond the lower rails 35, 36, each of the baskets pivots into the sauce, as shown in FIG. 3, until each of the baskets is vertically disposed in the sauce 39a. Adequate sauce is is provided in the tank to immerse completely the food products contained in the baskets. As the conveyor chains 27, 28 continue to transport each of the baskets 30 through the sauce, the chains slowly lift each of the baskets in sequence out of the sauce. After each of the baskets 30 has been completely removed from the sauce, each such basket 30 remains in a vertical position permitting the excess sauce to drip from the basket and the food products back into the sauce tank. When the rod 32 supporting the basket reaches the top outer quarter portion of the sprocket the basket engages downwardly curved ends 37b, 38b of the upper rails 37, 38. Preferably the baskets are rotated clockwise, as shown in FIG. 3, from the vertical to the horizontal position completing another 180 degrees of rotation of each of the baskets. The cooking cycle of broiling and dipping is repeated until the food products are completely cooked.

In accord with the present invention, when the food products are cooked, a pair of movable runners 50 are pulled outwardly from the front of the oven and over the top of the sauce tank 39 (See FIG. 4) to prevent the baskets when being removed from the oven from pivoting into the sauce tank. After the machine is reloaded with uncooked food products, the movable runners 50 are pushed back to the center of the oven.

Figure 4:
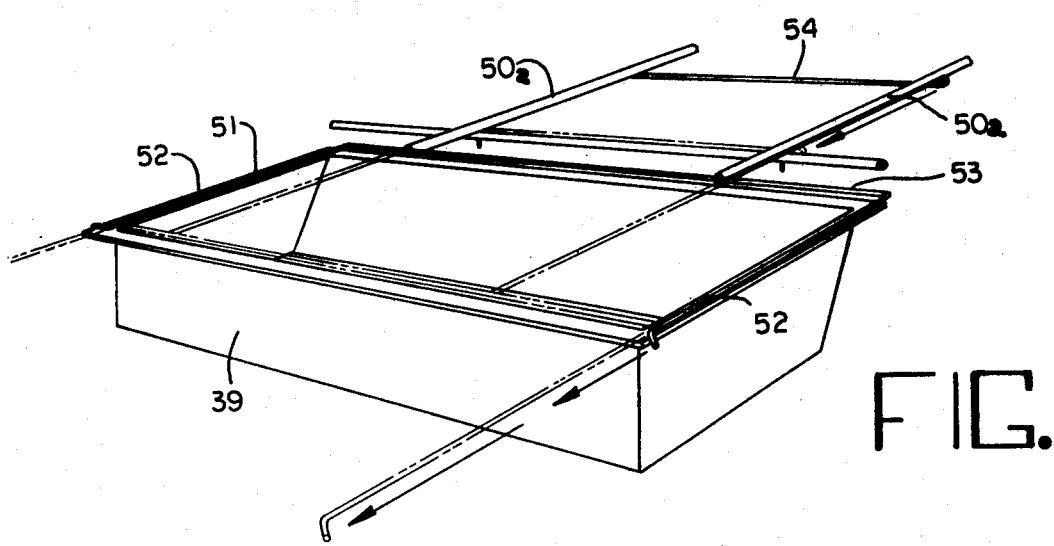
FIG. 4 is an isometric view of a slidable runner supported by the sauce tank of the automatic electric food cooking machine.

As best seen in FIG. 4 of the drawings, the movable runners 50 are part of a rack 50a comprising a C-shaped member 51 having bight portions 52 of the "C" normally disposed over the ends of the sauce tank 39 with the center portion 53 of the "C" disposed and supported by the rear of the sauce tank. The movable runners 50 are pivotally connected to the center portion 53 of the "C" and extend rearwardly therefrom. When the bight portions 52 are in the forward position as shown by the dashed lines in FIG. 4 of the drawings, such portions can be pivoted downwardly to avoid being bumped by the operator. A cross member 54 is fixedly secured to the runners 50 at the distal ends to add rigidity to the rack. When the rack 50a is in the forward position the runners 50 are disposed over the sauce tank.

The electrical heating elements 40 are employed for heating the food products in the baskets. In accord with the present invention, the heating elements 40 are suspended from the top walls as best shown in FIG. 3 of the drawings. Each of the heating elements extends inwardly from the side wall (See FIG. 2) toward the center of the oven and is suitably secured to the walls of the oven. The elements 40 are spaced above and below the top section of the conveyor chains 27, 28 thereby providing heat and radiant energy for cooking the food products not only as the products pass between the elements (See FIG. 3) but also when the baskets containing the food products pass below the heating elements. A pair of distribution boxes 41 disposed above the sidewalls are employed for interconnecting the electric conductors to the ends of heating elements 40. The configuration of the heating elements is conventional.

As best shown in FIG. 1 of the drawings, the front wall of the oven 12 is defined by a door 16 and is hingeably secured to the top wall 15 of the oven 12. By having a large door 16, the sauce tank 39 and the baskets 30 containing the food products can be readily inserted into and removed from the oven 12. Inasmuch as the door is defined by the entire front wall of the oven and is approximately five feet wide, the door is of substantial weight and it is difficult for an operator to open and close the door. To this end, counter weights 18 such as solid metal pieces of iron are secured to the door 16 thereby enabling the operator to position the door in any open or closed position with a small amount of force. Specifically a pair of rods 18a extend rearwardly from the sides of the door 16 and the weights 18 are secured to the ends of the rods. As is well known, the effect of the counter weights can be varied by moving the weights along the rods 18a to increase or decrease the mechanical advantage obtained from the weights.

Figure 5:
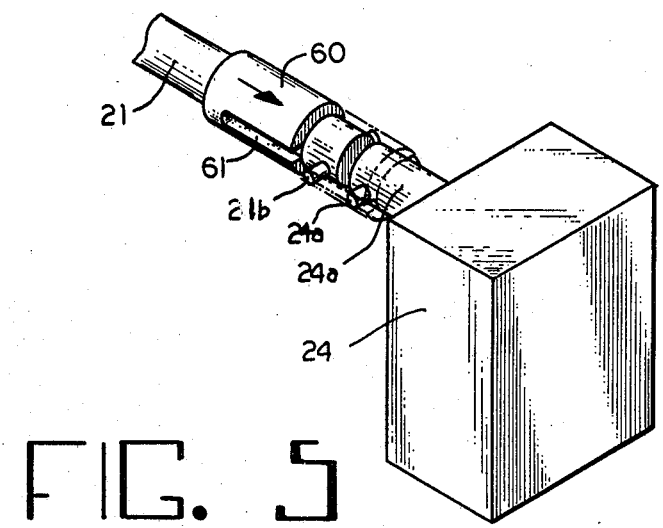
FIG. 5 is a fragmentary isometric view of a movable collar for interlocking the drive shaft to the driven shaft supporting the sprockets and the conveyor chains of the automatic electric food cooking machine.
Figure 6:
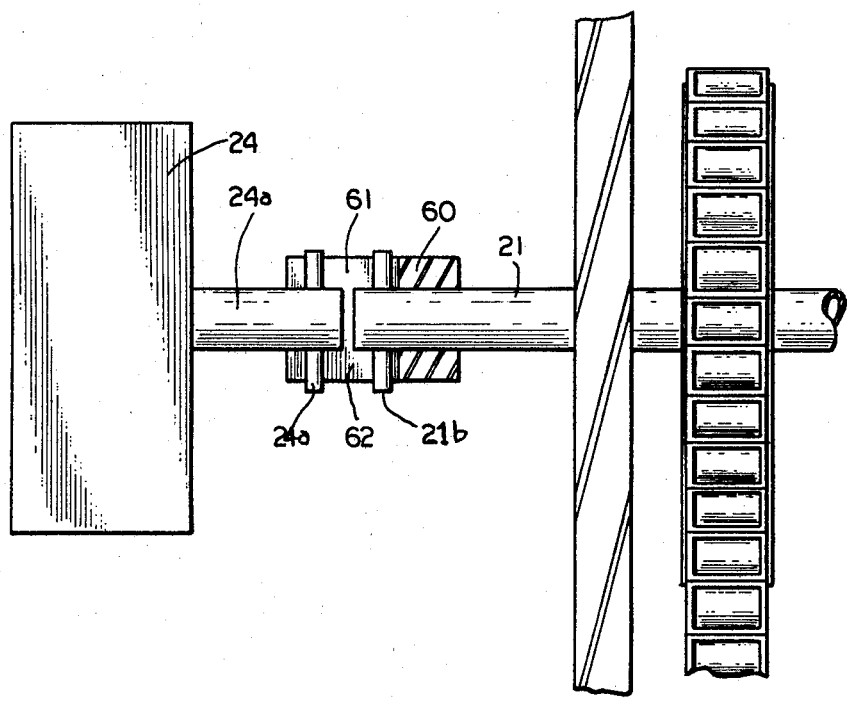
FIG. 6 is a sectional view of the movable collar shown in FIG. 5 interlocking the drive shaft to the driven shaft.

After the food products have been cooked or while inserting food products into the oven, the operator can halt periodically rotation of the baskets and the conveyor chains by shifting a collar 60 having a pair of U-shaped slots 61 as best shown in FIG. 5 of the drawings to disconnect the drive shaft 24a of the power means or motor 24 from the driven shaft 21 supporting the sprockets 25. Specifically, the shaft 21 and the drive shaft 24a are respectively provided with transverse pins 21a and 24a that are engagable by the collar 61 for interlocking the drive shaft of the motor to the driven shaft 21. The operator of the machine can thus readily connect or disconnect the drive motor to the shaft 21 supporting the sprockets for moving of the conveyor chains in the oven 15 by moving the collar toward the center of the shaft 21.

While there has been illustrated and described what is at present considered to be a preferred embodiment of the present invention, it will be appreciated that numerous changes and modifications are likely to occur to those skilled in the art, and it is intended in the appended claims to cover all these changes and modifications which fall within the true spirit and scope of the present invention.

The invention claimed is:

1. In an automatic cooking machine, the combination of an oven provided with a substantially unobstructed horizontal opening, electrical heating means disposed in the oven, conveyor means mounted in the oven, food carrying means connected to the conveyor means for carrying food products to be cooked over the heating means, a sauce tank mounted in the housing for receiving sauce, and a pair of spaced runners movable over the sauce pan whereby the carrying means holding the food products to be cooked is alternately transported along the heating means and disposed into the sauce in the sauce tank for applying the sauce into the food products until the food products are cooked and after the food products are cooked, the spaced runners are moved over the sauce tank to prevent the carrying means from dipping into the sauce tank.

2. The machine of claim 1, wherein the runners are connected to a C-shaped member disposed above the sides of the sauce tank.

3. An automatic food cooking machine comprising a frame, an oven supported by the frame, said oven having a pair of spaced side walls and a top wall and a bottom wall to define a substantially unobstructed horizontal opening between the front and rear of the oven, a first electrical heating means disposed in the top of the oven, carrying means disposed in the opening below the electrical heating means for holding food products to be cooked by the heating means, conveyor means disposed in the oven for transporting the carrying means in the opening in spaced relationship to the heating means from the front to the rear of the housing, the conveyor means comprising a pair of endless chains having an upper section and a lower section in spaced parallel relationship, the carrying means being connected to and between the chains and normal thereto for transporting the food products to be cooked through the heat and radiant energy emanating from the heating means, a second electrical heating means disposed between the upper section and the lower section of the conveyor means, the first and the second electrical heating means each comprising a plurality of heating elements in registry with each of the pair of endless chains, the electrical heating means being spaced from each other and extending downwardly from the top wall of the oven and then inwardly from the side walls, and drive means for driving the conveyor means.

4. An automatic food cooking machine comprising a frame, an oven supported by the frame, said oven having a pair of spaced side walls and a top wall and a bottom wall to define a substantially unobstructed horizontal opening between the front and rear of the oven, a first electrical heating means disposed in the top of the oven, carrying means disposed in the opening below the electrical heating means for holding food products to be cooked by the heating means, conveyor means disposed in the oven for transporting the carrying means in the opening in spaced relationship to the heating means from the front to the rear of the housing, an end wall detachably secured to one of the walls, the end wall being defined by a door movable from an open to a closed position to facilitate loading and unloading of the carrying means containing the food products in the oven, a counterweight secured to the door to facilitate opening and closing of the door, the end wall being hingeably secured to the top wall and the counterweight comprising a pair of weights secured to opposite sides of the door and disposed adjacent to the exterior sides of the side walls, and drive means for driving the conveyor means.

* * * * *